United States Patent
Brinkert et al.

(10) Patent No.: US 9,062,632 B2
(45) Date of Patent: Jun. 23, 2015

(54) INTERNAL COMBUSTION ENGINE FOR A MOTOR VEHICLE

(71) Applicant: DAIMLER AG, Stuttgart (DE)

(72) Inventors: Nils Brinkert, Stuttgart (DE); Thomas Kuhn, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 14/175,658

(22) Filed: Feb. 7, 2014

(65) Prior Publication Data

US 2014/0298804 A1    Oct. 9, 2014

Related U.S. Application Data

(63) Continuation-in-part of application No. PCT/EP2012/002993, filed on Jul. 17, 2012.

(30) Foreign Application Priority Data

Aug. 9, 2011   (DE) .......................... 10 2011 109 762

(51) Int. Cl.
| | |
|---|---|
| *F02B 33/44* | (2006.01) |
| *F02M 25/07* | (2006.01) |
| *F02B 37/00* | (2006.01) |
| *F02B 37/007* | (2006.01) |
| *F02B 37/02* | (2006.01) |

(52) U.S. Cl.
CPC .......... *F02M 25/0704* (2013.01); *F02B 37/002* (2013.01); *F02B 37/007* (2013.01); *F02B 37/025* (2013.01); *Y02T 10/144* (2013.01)

(58) Field of Classification Search
CPC .... F02B 37/002; F02B 37/007; F02B 37/025; F02M 25/0704; Y02T 10/144
USPC .............................. 60/39.6–39.63, 597–624; 12/559.1–566, 200–249
See application file for complete search history.

(56) References Cited

U.S. PATENT DOCUMENTS

| | | | |
|---|---|---|---|
| 4,339,922 | A | 7/1982 | Navarro |
| 5,020,327 | A * | 6/1991 | Tashima et al. .................. 60/600 |
| 7,363,761 | B1 * | 4/2008 | Dickerson ........................ 60/602 |
| 2007/0107430 | A1 * | 5/2007 | Schmid et al. ................... 60/612 |
| 2008/0000228 | A1 * | 1/2008 | Kieser ........................... 60/605.1 |
| 2010/0024419 | A1 * | 2/2010 | Pierpont et al. ................. 60/624 |

FOREIGN PATENT DOCUMENTS

| | | |
|---|---|---|
| DE | 34 45 835 | 7/1985 |
| DE | 198 26 355 | 12/1999 |
| DE | 10 2006 031 702 | 1/2008 |
| DE | 10 2004 015 108 | 4/2008 |
| EP | 0 215 754 | 3/1987 |
| EP | 0 334 206 | 9/1989 |
| EP | 2 246 543 | 11/2010 |
| WO | WO 2006/076954 | 7/2006 |

* cited by examiner

*Primary Examiner* — Jesse Bogue
(74) *Attorney, Agent, or Firm* — Klaus J. Bach

(57) ABSTRACT

In an internal combustion engine for a motor vehicle, having a first cylinder bank and a second cylinder bank and an exhaust tract including a first exhaust manifold and a second exhaust manifold with a first exhaust gas duct and a second exhaust gas duct and a first exhaust gas turbocharger including a first turbine situated in the exhaust tract and a second exhaust gas turbocharger including a second turbine arranged in the exhaust tract, the first turbine and the second turbine are selectively drivable in alternation by at least a portion of the exhaust gas via a valve device that is switchable between at least three positions and is situated upstream from the first turbine and the second turbine so that, in a first position of the valve device, the engine is operated in a pulse supercharging mode; in a second position of the valve device, the engine is operated in a ram charging mode and in a third position of the valve device, the engine is operated in a sequential supercharging mode.

4 Claims, 3 Drawing Sheets

INTERNAL COMBUSTION ENGINE FOR A MOTOR VEHICLE

This is a Continuation-In-Part application of pending international patent application PCT/EP2012/002993 filed Jul. 17, 2012 and claiming to priority of German patent application 10 2011 109 762.0 filed Aug. 9, 2011.

BACKGROUND OF THE INVENTION

The invention relates to an internal combustion engine for a motor vehicle, having first and second cylinder banks with first and second exhaust gas lines and first and second exhaust gas turbochargers, with the exhaust gas flow from the first and the second cylinder banks to the first and second turbochargers and the combustion gas supply to the cylinders being manipulated to selectively provide for a ram charging, pulse charging or sequential supercharging engine operating mode.

DE 10 2004 015 108B4 discloses an internal combustion engine having multiple cylinders, an intake line system, an exhaust line system, an exhaust gas recirculation system, and at least one exhaust gas turbocharger. A number of first cylinders are continuously connected to an exhaust gas collection line which supplies the exhaust gas to an exhaust gas turbine of the exhaust gas turbocharger. The exhaust gas from at least one second cylinder or a group of second cylinders is selectively supplied to an exhaust gas recirculation line which is connected to the intake line system, or to the exhaust gas turbine of the exhaust gas turbocharger. At least two different turbines which are optimized for accommodating exhaust gas at different load states in the part load range, with a different number of second cylinders taking part in the exhaust gas recirculation, are provided which are connectable and disconnectable as a function of the connection of the second cylinders to the exhaust gas recirculation system. In addition, it is provided that the turbines are connected and disconnected as a function of the switch positions of the switching elements.

It is the object of the present invention to provide an internal combustion engine for a motor vehicle which allows more efficient operation.

SUMMARY OF THE INVENTION

In an internal combustion engine for a motor vehicle, having a first cylinder bank and a second cylinder bank and an exhaust tract including a first exhaust manifold and a second exhaust manifold with a first exhaust gas duct and a second exhaust gas duct and a first exhaust gas turbocharger including a first turbine situated in the exhaust tract and a second exhaust gas turbocharger including a second turbine arranged in the exhaust tract, the first turbine and the second turbine are selectively drivable in alternation by at least a portion of the exhaust gas via a valve device that is switchable between at least three positions and is situated upstream from the first turbine and the second turbine so that, in a first position of the valve device, the engine is operated in a pulse supercharging mode; in a second position of the valve device, the engine is operated in a ram charging mode and in a third position of the valve device, the engine is operated in a sequential supercharging mode.

A first exhaust gas turbocharger and at least one second exhaust gas turbocharger are provided. The first exhaust gas turbocharger includes a first turbine which is situated in an exhaust tract of the internal combustion engine. The second exhaust gas turbocharger includes a second turbine which is likewise situated in the exhaust tract of the internal combustion engine. The first turbine and the second turbine may be operated differently by means of a valve device of the internal combustion engine which is situated in the exhaust gas tract upstream from the first turbine and the second turbine and is switchable between at least three positions. In a first position of the valve device and in a second position of the valve device, only the first turbine may be acted on by exhaust gas from the internal combustion engine, whereas in a third position of the valve device, the first turbine and the second turbine may be acted on by exhaust gas from the internal combustion engine. So-called sequential supercharging is thus provided, by means of which the internal combustion engine according to the invention may be operated and supercharged in a particularly efficient manner as a function of its load point and operating point.

The first turbine has a first inlet duct and a second inlet duct, the first inlet duct being connected to the first exhaust gas duct, and the second inlet duct being connected to the second exhaust gas duct.

In the first position of the valve device, exhaust gas from the first cylinder bank may flow through the first duct, and exhaust gas from the second cylinder bank may flow through the second duct. In other words, this means that exhaust gas from the first cylinder bank is directed onto a turbine wheel situated in the first turbine solely via the first duct, and exhaust gas from the second exhaust gas duct is directed onto the turbine wheel of the first turbine solely via the second duct. Pulse supercharging of the first exhaust gas turbocharger may thus be achieved in the first position of the valve device.

The fluidic separation of the ducts of the first turbine also results in a particularly advantageous and favorable response characteristic of the internal combustion engine according to the invention. Likewise, this may advantageously provide particularly high torques, even at low rotational speeds.

Another advantage of the multi-duct configuration of the first turbine and the fluidic separation of the ducts is that the first turbine may be relatively large with regard to its flow cross sections, which in turn results in a desired high efficiency of the first turbine, and at the same time results in large quantities of exhaust gas to be recirculated.

The pulse supercharging allows particularly efficient supercharging of the internal combustion engine so that it may be operated with only very low fuel consumption and low $CO_2$ emissions. Due to the multi-duct configuration of the first turbine and the corresponding separation of the first duct and the second duct of the first turbine, the internal combustion engine according to the invention may be operated particularly advantageously in pulse supercharging mode, which favors low fuel consumption and low $CO_2$ emissions of the internal combustion engine. This means that the particularly advantageous sequential supercharging is combined with the particularly advantageous pulse supercharging in the internal combustion engine, which is accompanied by efficient operation of the internal combustion engine.

In the second position of the valve device, the first exhaust gas duct and the second exhaust gas duct are fluidically combined. This means that exhaust gas from the first exhaust gas duct and from the second exhaust gas duct flows through the first duct and the second duct. The exhaust gas from the first exhaust gas duct and from the second exhaust gas duct is combined with the aid of the valve device, so that exhaust gas from the first exhaust gas duct and from the second exhaust gas duct may flow jointly through the first duct or the second duct. Ram supercharging of the first exhaust gas turbocharger may thus be achieved. This means, for example, that the combining of the exhaust gas ducts is integrated into the valve device, for example into a housing of the valve device. As a result, the internal combustion engine according to the invention has a particularly low space requirement, which prevents and/or solves packaging problems, in particular in a space-critical area such an engine compartment of the motor vehicle, in particular a passenger vehicle.

Additional, separate exhaust gas piping for combining the exhaust gas ducts is not necessary and is not provided, which minimizes the number of parts, the weight, and the costs of the internal combustion engine according to the invention.

Sequential supercharging of the first exhaust gas turbocharger and of the second exhaust gas turbocharger is achievable in the third position of the valve device. In the third position of the valve device, the first exhaust gas duct, the second exhaust gas duct, and a third exhaust gas duct are fluidically combined. The third exhaust gas duct is designed as exhaust gas flow duct extending to the second turbine: i.e., exhaust gas from the internal combustion engine is suppliable to the second turbine with the aid of the third exhaust gas duct, so that the first exhaust gas turbocharger and the second exhaust gas turbocharger are simultaneously in operation for the sequential supercharging.

For providing particularly low fuel consumption and thus low $CO_2$ emissions, and for achieving at least low nitrogen oxides emissions from internal combustion engines such as the internal combustion engine according to the invention, the first turbine and the second turbine are designed to be particularly small with regard to their dimensions and in particular with regard to their flow cross sections, through which the exhaust gas from the internal combustion engine may flow. Particularly advantageous damming behavior of the turbines may thus be provided, so that a particularly large quantity of exhaust gas may be recirculated from the exhaust tract to an intake tract of the internal combustion engine and introduced into the intake tract. Air supplied the internal combustion engine may thus be acted on by exhaust gas, which acts as inert gas during combustion of an air-fuel mixture in the combustion chambers. This keeps the generation of nitrogen oxides emissions low.

Traditionally, this particularly small design of the turbines with regard to their dimensions results in an undesirable low efficiency of the turbines, which in turn results in less than optimal utilization of energy from the exhaust gas, leading to undesirably high fuel consumption due to charge cycle losses. Traditional $CO_2$ savings potentials thus remain unused if no appropriate countermeasures are taken.

In the internal combustion engine according to the invention, the turbines may have and enable the described advantageous damming behavior, so that correspondingly high quantities of exhaust gas may be recirculated. Due to the multi-duct configuration of the first turbine, in which the ducts are fluidically separated from one another at least in part, a discharge process of exhaust gas from the cylinders with regard to a residual content of exhaust gas may be designed in a particularly advantageous manner. As a result, the need for providing a particularly narrow cam for activating particular exhaust valves of the combustion chambers at low speeds of the internal combustion engine may be minimized. In addition, the design of gas exchange valves as well as exhaust valves of the internal combustion engine is relatively simple and therefore cost-effective.

Due to the switchability of the valve device, switchability between the first turbine and the second turbine is provided, so that the first turbine alone or the second turbine in addition to the first turbine may be selectively acted on by exhaust gas and is/are thus drivable, and the valve device therefore has at least one first position, one second position, and one third position. In the first position, the first turbine is driven by exhaust gas, which flows through the two ducts which are separate from one another, at least in part. In the second position, likewise only the first turbine is driven, but the exhaust gas from the first exhaust gas duct and from the second exhaust gas duct is combined upstream from the turbine wheel with the aid of the valve device, so that exhaust gas form both exhaust gas ducts enters the turbine independently of the cylinder banks. In the third position, in addition, the second turbine is acted on and driven by exhaust gas. Degrees of freedom of the internal combustion engine are thus provided, thereby achieving particularly simple and at least essentially torque-neutral switching between the turbines. This is accompanied by particularly law fuel consumption and therefore low $CO_2$ emissions. In addition, high supercharging rates may be established, even at high speeds of the internal combustion engine. In the internal combustion engine according to the invention which is a gasoline engine, for example, these high supercharging rates are achievable without fuel enrichment, i.e., without additional fuel consumption.

The internal combustion engine according to the invention is thus particularly adaptable as needed to different operating points in a particularly efficient manner, resulting in operation of the internal combustion engine according to the invention with particularly high efficiency and low fuel consumption.

The internal combustion engine according to the invention ideally has two or three cylinders for each cylinder bank, and is accordingly a four-cylinder or six-cylinder engine, since in particular in such a four-cylinder or six-cylinder engine the charge cycle may benefit from the multi-duct configuration of the first turbine, and thus, from the separation of the combustion chambers and their distribution in the particular exhaust gas ducts. Charge cycle losses may thus be kept low. This is accompanied by particularly low fuel consumption and low $CO_2$ emissions.

In one advantageous embodiment of the invention, the first turbine of the first exhaust gas turbocharger has a larger effective flow cross section through which more exhaust gas from the internal combustion engine may flow than does through the second turbine of the second exhaust gas turbocharger. Additionally or alternatively, the first turbine may have higher mass inertia than the second turbine. The mass inertia refers to the rotational mass inertia of a first turbine wheel situated in a first turbine housing of the first turbine and of a second turbine wheel situated in a second turbine housing of the second turbine.

In the first position of the valve device, which is preferably selected at a low load range of the internal combustion engine, the turbine wheel and therefore the first exhaust gas turbocharger is operable in pulse mode, so that a so-called turbo lag may be quickly overcome despite the higher mass inertia.

In the second position of the valve device, which is preferably selected in the border range between a low load and speed range and an average load and speed range, the first exhaust gas turbocharger is operable in ramming mode, so that, since the first exhaust gas turbocharger now no longer has to be accelerated from a standstill as is the case in pulse mode, on account of the more uniform action on the turbine in comparison to the first position of the valve a reduction in fuel consumption may now be achieved due to increased efficiency of the exhaust gas turbocharger, once again in comparison to a pulse mode of the exhaust gas turbocharger according to the first position.

In the upper load and speed range of the internal combustion engine, the two exhaust gas turbochargers are operable in sequential mode, for this purpose it being necessary to select the third position of the valve device. One particular advantage of the connection of the second exhaust gas turbocharger with the aid of the valve device is that a drop in the charge air pressure, which usually occurs when the second exhaust gas turbocharger is connected in the sequential supercharging mode, can be reduced.

Thus, the internal combustion engine according to the invention has a particularly high level of advantageous vehicle dynamics and a particularly advantageous driving characteristic in the high load and speed ranges and full load ranges as well as in lower load and speed ranges, while at the same time achieving low fuel consumption and low $CO_2$ emissions.

In another advantageous embodiment of the invention, a first compressor is associated with the first turbine, and a second compressor is associated with the second turbine. The first and the second compressor are situated in an intake tract of the internal combustion engine. The first compressor is drivable by the first turbine, and the second compressor is drivable by the second turbine. Air drawn in by the internal combustion engine is compressed by means of the compressor. The switchability between the turbines by means of the valve device also has the advantage that the compressor as well may be driven as needed in a particularly efficient manner. Thus, the internal combustion engine is supplied at least essentially optimally with compressed air (charge air) in at least practically all load points of its characteristic map, so that it may provide high power and/or high torque essentially without delay, practically over the entire characteristic map. The so-called turbo lag may thus be avoided.

The internal combustion engine according to the invention may be designed according to the so-called downsizing concept. Accordingly, the internal combustion engine has only a small displacement, but is able to satisfy the particularly high power and/or torque demanded by the driver of the motor vehicle practically over the entire characteristic map due to the particularly advantageous supercharging by the compressors. This keeps the space requirements and in particular the weight of the internal combustion engine according to the invention low, so that the overall motor vehicle may be driven with only very low energy consumption.

Further advantages, features, and particulars of the invention will become more readily apparent from the following description of preferred exemplary embodiments of the invention with reference to the accompanying drawings. The features and feature combinations mentioned above in the description as well as the features and feature combinations mentioned below in the description of the figures and/or only shown in the figures may be used not only in the particularly stated combination, but also in other combinations or alone without departing from the scope of the invention.

DESCRIPTION OF EXEMPLARY EMBODIMENTS OF THE INVENTION

Figure 1:
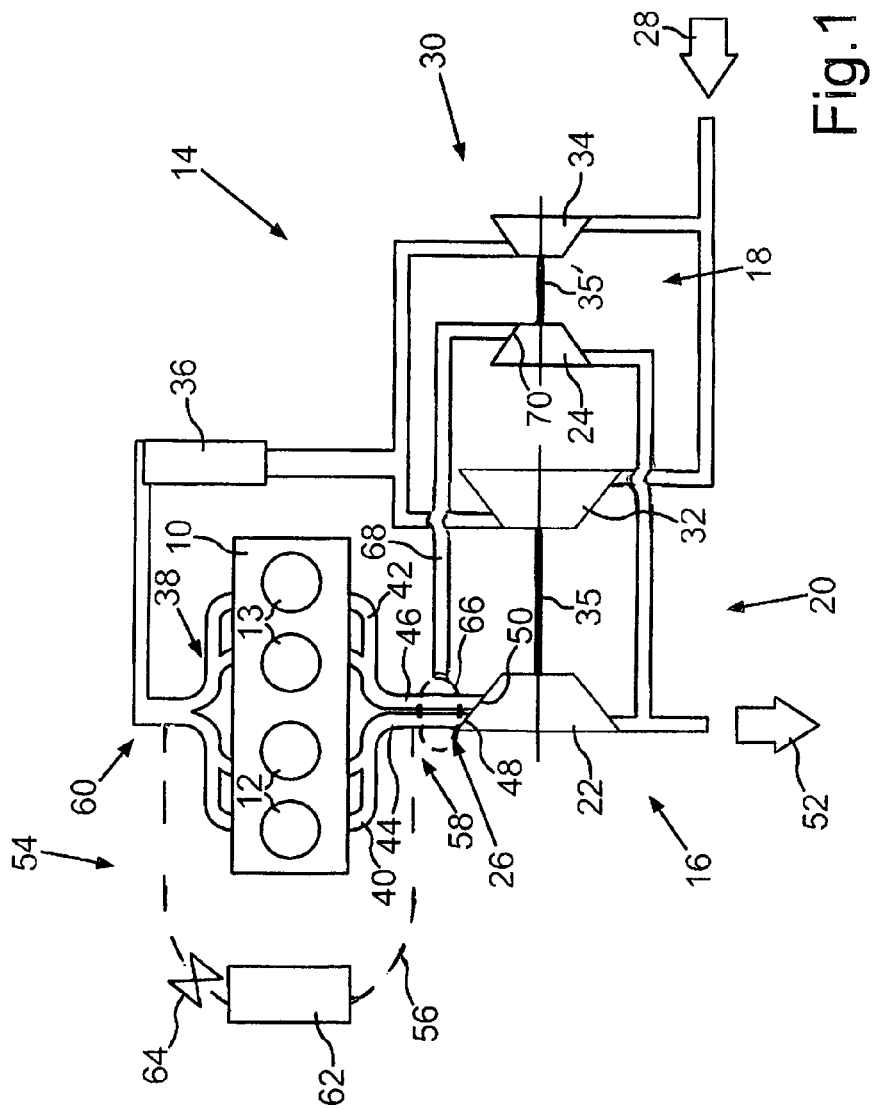
FIG. 1 shows schematically an internal combustion engine having two exhaust gas turbochargers by means of which sequential supercharging of the internal combustion engine is provided, the internal combustion engine being a four-cylinder reciprocating internal combustion engine.

FIG. 1 shows an internal combustion engine 10 which is a four-cylinder reciprocating internal combustion engine and which has a first section herein termed a first cylinder bank 12 including two cylinders and a second section termed a second cylinder bank 13 including another two cylinders. The internal combustion engine 10 includes a supercharger arrangement 14 having a first exhaust gas turbocharger 16 and a second exhaust gas turbocharger 18. By use of the second supercharger arrangement 14, a pulse supercharging mode, a ram supercharging modee, and a sequential supercharging mode of operation may be provided, so that the internal combustion engine 10 is operable in the mentioned supercharging modes by an appropriate use of the supercharger arrangement 14.

The first exhaust gas turbocharger 16 includes a first turbine 22 which is situated in an exhaust tract 20 of the internal combustion engine 10. The second exhaust gas turbocharger 18 includes a second turbine 24 which is situated in the exhaust tract 20, in addition, the supercharger arrangement 14 includes an adjusting valve 26, which likewise is situated in the exhaust tract 20, upstream from the first turbine 22 and upstream from the second turbine 24. The adjusting valve 26 is designed in such a way that it may be brought into a first position, a second position, and a third position. In the first position the first turbine 22 may be acted on by exhaust gas from the internal combustion engine 10 with pulse supercharging, in the second position the first turbine 22 may be acted on by the exhaust gas with ram supercharging, and in the third position of the adjusting valve 26 the first turbine 22 and the second turbine 24 may be acted on by exhaust gas from the internal combustion engine with sequential supercharging.

The switching of the adjusting valve 26 takes place as a function of load points in a characteristic map of the internal combustion engine 10. In low load and speed ranges, preferably only the first turbine 22 is acted on by exhaust gas. In contrast, in average and high load and speed ranges up to full load ranges of the characteristic map, the first turbine 22 and the second turbine 24 are activated.

During operation of the internal combustion engine 10, the internal combustion engine draws in air from the surroundings, as illustrated by a directional arrow 28. The air flows through intake piping of an intake tract 30 of the internal combustion engine 10 to a first compressor 32 of the first exhaust gas turbocharger 16, or to a second compressor 34 of the second exhaust gas turbocharger 18, depending on which of the turbines 22 or 24 is activated. The air is then compressed and thus heated by the first compressor 32, or the first compressor 32 and the second compressor 34, depending on whether the first turbine 22, or the first turbine 22 and the second turbine 24, is/are activated, The first compressor 32 and the second compressor 34 are respectively coupled via a shaft 35 and a shaft 35' to the first turbine 22 or respectively to the second turbine 24, so that the first compressor 32 and the second compressor 34 are drivable by the first turbine 22 and the second turbine 24, respectively, with the aid of the respective shaft 35, 35'.

After the compression, the compressed air flows further to a charge air cooler 36 situated in the intake tract 30, via which the air is cooled. A charge air distributor 38 is situated downstream from the charge air cooler 36 in the direction of flow of the air through the intake tract 30, and distributes the compressed and cooled air to the first cylinder bank 12 and the second cylinder bank 13.

The compressed air is mixed with fuel which is combusted in a known manner, either in a gasoline engine, a diesel engine, or a DiesOtto (combined combustion) engine, so that at the end of the combustion process, exhaust gas is present in cylinders of the first cylinder bank 12 and of the second cylinder bank 13.

The exhaust gas is discharged from the cylinders by means of pistons positioned in the cylinders. As is apparent from FIG. 1, the exhaust gas from the cylinders of the first cylinder bank 12 is collected by means of a first exhaust manifold 40.

In addition, a second exhaust manifold 42 is situated in the exhaust tract 20, with the aid of which the exhaust gas from the two cylinders of the second cylinder bank 13 is collectable. The two cylinders of the second cylinder bank 13 are thus fluidically combined via the second exhaust manifold 42.

The first exhaust manifold 40 has a first exhaust gas duct 44, while the second exhaust manifold 42 has a second exhaust gas duct 46. Thus, exhaust gas from the cylinders of the first cylinder bank 12 flows through the first exhaust gas duct 44, whereas exhaust gas from the cylinders of the second cylinder bank flows through the second exhaust gas duct 46.

As is apparent from FIG. 1, the first turbine 22 has a dual-duct design, that is, a first duct 48 which corresponds to the first exhaust gas duct 44 and which is fluidically connected thereto, as well as a second duct 50 which corresponds to the second exhaust gas duct 46 and which is fluidically connected thereto. This means that exhaust gas from the first exhaust gas duct 44, and thus, exhaust gas from the two cylinders of the first cylinder bank 12, flows through the first duct 48. Exhaust gas from the second exhaust gas duct 46, and thus, exhaust gas from the two cylinders of the second cylinder bank 13, flows through the second duct 50.

The first duct 48 and the second duct 50 are fluidically separate from one another, at least in part, so that a duct separation of the first turbine 22 is provided.

The exhaust gas is supplied via the first duct 48 and the second duct 50 to a first turbine wheel of the first turbine 22, which is driven by the exhaust gas. After driving the first turbine wheel, the exhaust gas flows from the first turbine 22 through a first turbine wheel outlet in which the exhaust gas from the first duct 48 and the second duct 50 is collected, as indicated by a directional arrow 52.

In the third position of the adjusting valve 26, the first exhaust gas duct 44, the second exhaust gas duct 46, and a third exhaust gas duct 68, via which exhaust gas from the internal combustion engine flows through the second turbine 24, are fluidically connected to one another, as indicated by a dashed line 66 in FIG. 1. In other words, the second turbine 24 has a third duct 70 which is fluidically connected to the further exhaust gas duct 68.

This means that the exhaust gas mass flow from the first exhaust gas duct 44 and the second exhaust gas duct 46 are combined into an overall exhaust gas mass flow which is able to flow through the third exhaust gas duct 68 in addition to the first exhaust gas duct 44 and the second exhaust gas duct 46, and which subsequently flows through the first turbine 22 and the second turbine 24. A second turbine wheel of the second turbine 24 is supplied with the exhaust gas via the third duct 70 of the second turbine 24, and is thus driven by the exhaust gas. After driving the second turbine wheel, the exhaust gas flows further, as indicated by the directional arrow 52.

Figure 2:
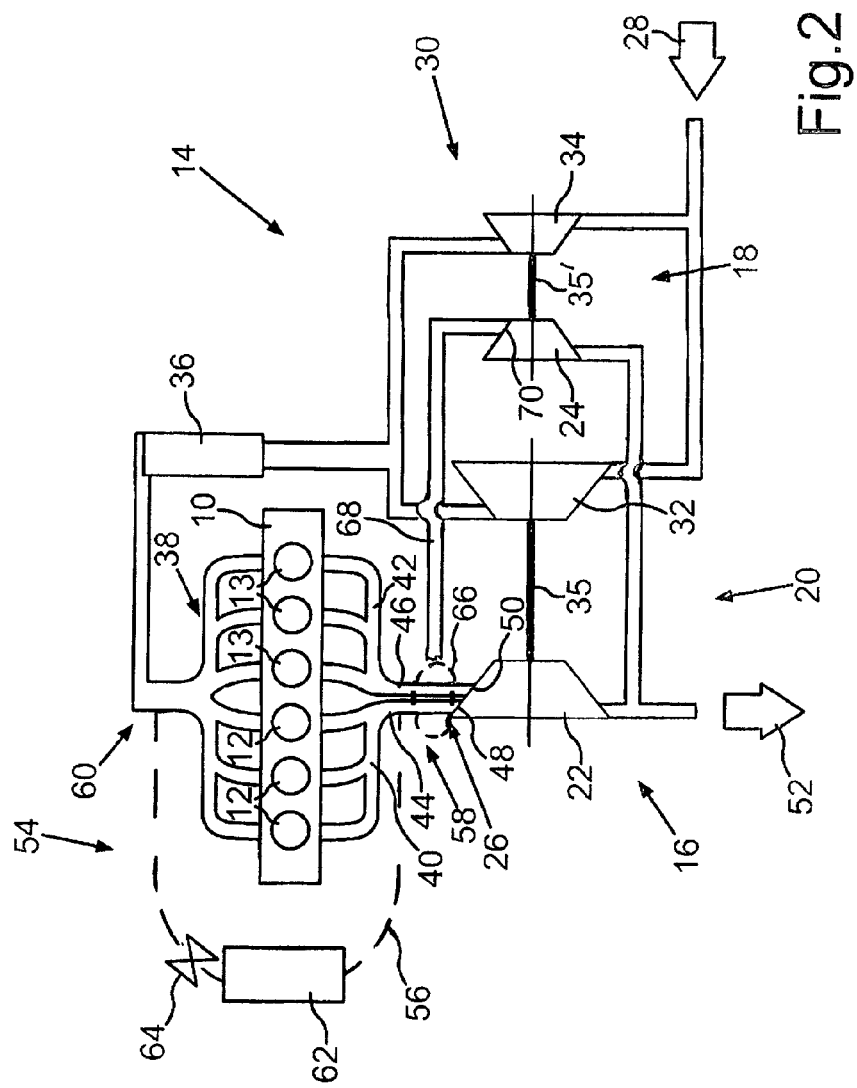
FIG. 2 shows schematically an alternative embodiment of the internal combustion engine according to FIG. 1, the internal combustion engine being a six-cylinder reciprocating internal combustion engine.

This advantageous switchability of the adjusting valve 26 and the advantageous combining of the first exhaust gas duct 44, the second exhaust gas duct 46, and the third exhaust gas duct 68 by means of the adjusting valve 26 may also be used in an internal combustion engine 10 having six cylinders 12, as illustrated in FIG. 2.

The internal combustion engine 10 also includes an exhaust gas recirculation device 54 having a recirculation line 56. The recirculation line 56 is fluidically connected to the first exhaust gas duct 44 at a branch point 58. in addition, the recirculation line 56 is fluidically connected to the intake tract 30 at an inlet point 60. Exhaust gas may thus be branched from the first exhaust gas duct 44, recirculated to the intake tract 30, and introduced into the intake tract 30 at the inlet point 60. It is thus possible for the drawn-in, compressed air to be acted on by exhaust gas. The exhaust gas is transported by the air into the cylinders 12 and 13, and during the combustion of the air-fuel mixture acts as inert gas, by means of which nitrogen oxides (NOx) emissions and soot emissions may be kept low.

The exhaust gas recirculation device 54 includes an exhaust gas recirculation cooler 62, situated at least partially in the recirculation line 54, by means of which the exhaust gas to be recirculated is coolable. In addition, an exhaust gas recirculation valve 64 of the exhaust gas recirculation device 54 is provided. A desired quantity of exhaust gas to be recirculated may be variably set by means of the exhaust gas recirculation valve 64. The quantity of exhaust gas to be recirculated may thus be adjusted as needed to different operating points of the internal combustion engine 10.

Due to the multi-duct configuration of the first turbine 22, the first duct 44 may function as a first so-called exhaust gas recirculation (EGR) duct. The primary task of the first exhaust gas duct 44, and thus of the first duct 48, is to provide a particularly high-level damming behavior so that particularly high quantities of exhaust gas may be recirculated to the intake tract 30.

Accordingly, the second exhaust gas duct 46 and therefore the second duct 50 are each designed as a so-called λ duct. The task of the second exhaust gas duct 46, and thus of the second duct 50, in particular is to provide an appropriate air-fuel ratio (combustion air ratio λ) by supplying the first turbine 22 with exhaust gas, so that the internal combustion engine 10 may provide a required torque and/or a required power.

Figure 3:
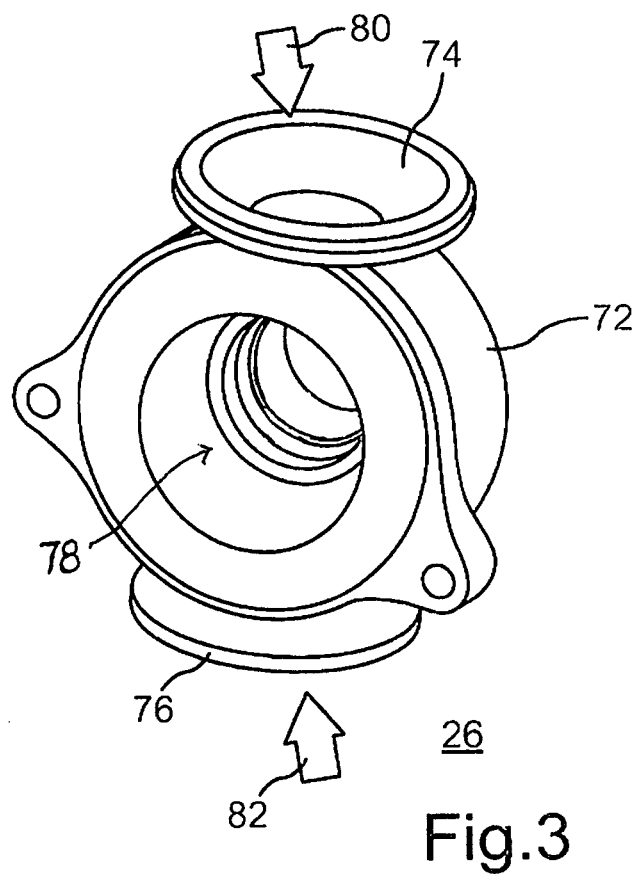
FIG. 3 shows schematically in a perspective view a valve device of the internal combustion engine according to FIGS. 1 and 2, by means of which a first turbine of a first of the exhaust gas turbochargers or a second turbine of the second of the exhaust gas turbochargers may selectively be driven by exhaust gas from the internal combustion engine.

FIG. 3 shows the adjusting valve 26 of the supercharger device 14 according to FIGS. 1 and 2. The adjusting valve 26 has a base body 72 on which a first connecting piece 74 and a second connecting piece 76 are mounted. The adjusting valve 26 may he fluidically connected to the first exhaust gas duct 44 via the first connecting piece 74, so that the exhaust gas via the first exhaust gas duct 44 may flow into a chamber 78 of the adjusting valve 26, which is delimited by the at least essentially annular base body 72 via the first connecting piece 74. This is indicated by a directional arrow 80.

Similarly, the adjusting valve 26 may be fluidically connected to the second exhaust gas duct 46 via the second connecting piece 76. Thus, the exhaust gas flowing through the second exhaust gas duct 46 may flow into the chamber 78 via the second connecting piece 76. This is indicated by a further directional arrow 82 in FIG. 3. Due to the corresponding positions of the adjusting valve 26 as well as corresponding fluidic connections of the first turbine 22 and of the second turbine 24, the exhaust gas from the first exhaust gas duct 44 and the second exhaust gas duct 46 may then either be separately supplied to the first duct 48 and the second duct 50 (pulse supercharging by the first exhaust gas turbocharger 16 or the first turbine 22), combined in the chamber 78 and subsequently supplied to the first duct 48 and the second duct 50 (ram supercharging by the first exhaust gas turbocharger 16 or the first turbine 22), or combined in the chamber 78 and subsequently supplied to the first duct 48, the second duct 50, and the third duct 70 (sequential supercharging by the supercharger device 14).

This means that the internal combustion engine 10 is operable in a pulse supercharging mode by means of the first turbine 22 and its two segments in the form of the first duct 48 and the second duct 50 and the accompanying duct separation, while in the second position of the adjusting valve 26 the internal combustion engine 10 is operable in a ram supercharging mode due to the combining of the first exhaust gas duct 44 and the second exhaust gas duct, or in the third position of the adjusting valve 26 the internal combustion engine 10 is operable in a sequential mode due to the combining of the first exhaust gas duct 44, the second exhaust gas duct 46, and the third exhaust gas duct 68.

Of course, the valve device (26) likewise comprises a valve device which is [switchable] in only two positions, namely, the first position and the third position. Switching the valve device (26) into the second position takes only an infinitesimally small amount of time, but the switching into the second position is still included, since prior to switching into the sequential supercharging, the ducts which are separate according to the pulse supercharging must first be put into ram supercharging in order to bring about sequential supercharging.

What is claimed is:

1. An internal combustion engine for a motor vehicle, having a first cylinder bank (12) and a second cylinder bank (13), comprising an exhaust tract (20) including a first exhaust manifold (40) and a second exhaust manifold (42), the first exhaust manifold (40) with a first exhaust gas duct (44) being associated with the first cylinder bank (12), and the second exhaust manifold (42) with a second exhaust gas duct (46) being associated with the second cylinder bank (13), a first exhaust gas turbocharger (16) including a first turbine (22) arranged in the exhaust tract (20) and at least one second exhaust gas turbocharger (18) including a second turbine (24) arranged in the exhaust tract (20), the first turbine (22) and the second turbine (24) being selectively drivable in alternation by at least a portion of the exhaust gas from the first cylinder bank (12) and from the second cylinder bank (13) via a single adjusting valve (26) which is arranged upstream of the first turbine (22) and the second turbine (24) and is switchable between at least three positions wherein the first turbine (22) has a first inlet duct (48) through which, in a first position of the adjusting valve (26), only exhaust gas from the first exhaust gas duct (44) of the first cylinder bank (12) may flow, and a second inlet duct (50) through which, in the first position of the adjusting valve (26), only exhaust gas from the second exhaust gas duct (46) of the second cylinder bank (13) may flow while no exhaust gas is supplied to the second turbine (24) and the internal combustion engine is operable in a pulse supercharging mode, and in the second position of the adjusting valve (26) the first exhaust gas duct (44) and the second exhaust gas duct (46) are fluidically combinable and no exhaust gas is supplied to the second turbine (24) and the internal combustion engine is operable in a ram supercharging mode, and, in the third position of the adjusting valve (26), the first exhaust gas duct (44), the second exhaust gas duct (46) and a third exhaust gas duct (68) are fluidically combined so that exhaust gas is also supplied to the second turbine (24) and the internal combustion engine is operated in a sequential supercharging mode.

2. The internal combustion engine according to claim 1, wherein the first turbine (22) has a larger flow cross-section than the second turbine (24) so that more exhaust gas from the internal combustion engine (10) may flow through the first turbine (22) than through the second turbine (24).

3. The internal combustion engine according to claim 1, wherein a first compressor (32) for compressing air, which is drivable by the first turbine (22), is associated with the first turbine (22), and a second compressor (34) for compressing air, which is drivable by the second turbine (24), is associated with the second turbine (24), the first compressor (32) and the second compressor (34) being disposed in an intake tract (30) of the internal combustion engine (10) to which the compressed air is supplied in a parallel flow arrangement.

4. A motor vehicle including an internal combustion engine having a first cylinder bank (12) and a second cylinder bank (13), comprising an exhaust tract (20) including a first exhaust manifold (40) and a second exhaust manifold (42), the first exhaust manifold (40) with a first exhaust gas duct (44) being associated with the first cylinder bank (12), and the second exhaust manifold (42) with a second exhaust gas duct (46) being associated with the second cylinder bank (13), a first exhaust gas turbocharger (16) including a first turbine (22) arranged in the exhaust tract (20) and at least one second exhaust gas turbocharger (18) including a second turbine (24) arranged in the exhaust tract (20), the first turbine (22) and the second turbine (24) being selectively drivable in alternation by at least a portion of the exhaust gas from the first cylinder bank (12) and from the second cylinder bank (13) via a single adjusting valve (26) which is arranged upstream of the first turbine (22) and the second turbine (24) and is switchable between at least three positions wherein the first turbine (22) has a first inlet duct (48) through which, in a first position of the adjusting valve (26), only exhaust gas from the first exhaust gas duct (44) of the first cylinder bank (12) may flow, and a second inlet duct (50) through which, in the first position of the adjusting valve (26), only exhaust gas from the second exhaust gas duct (46) of the second cylinder bank (13) may flow while no exhaust gas is supplied to the second turbine (24) and the internal combustion engine is operable in a pulse supercharging mode, and in the second position of the adjusting valve (26) the first exhaust gas duct (44) and the second exhaust gas duct (46) are fluidically combinable and no exhaust gas is supplied to the second turbine (24) and the internal combustion engine is operable in a ram supercharging mode, and, in the third position of the adjusting valve (26), the first exhaust gas duct (44), the second exhaust gas duct (46) and a third exhaust gas duct (68) are fluidically combined so that exhaust gas is also supplied to the second turbine (24) and the internal combustion engine is operated in a sequential supercharging mode.

* * * * *